United States Patent [19]
van der Lely

[11] Patent Number: 6,044,793
[45] Date of Patent: *Apr. 4, 2000

[54] APPARATUS FOR AUTOMATICALLY MILKING ANIMALS

[76] Inventor: Cornelis van der Lely, 7 Brüschenrain, CH-6300 Zug, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,249

[22] Filed: Nov. 14, 1996

[30] Foreign Application Priority Data

Nov. 14, 1995 [NL] Netherlands ............................ 1001645

[51] Int. Cl.$^7$ ........................................................ A01J 3/00
[52] U.S. Cl. ................................... 119/14.03; 119/14.08; 119/14.47; 119/520
[58] Field of Search ............................. 119/14.02, 14.03, 119/14.08, 14.47, 868, 867, 517, 516, 520, 518, 519, 521

[56] References Cited

U.S. PATENT DOCUMENTS

| | | | |
|---|---|---|---|
| 4,838,207 | 6/1989 | Bom et al. ................................ | 119/14 |
| 4,854,268 | 8/1989 | Kipe ..................................... | 119/14.03 |
| 5,042,428 | 8/1991 | Van der Lely et al. .................... | 119/14 |
| 5,069,160 | 12/1991 | Street et al. ........................... | 119/14.08 |
| 5,606,932 | 3/1997 | van der Lely ............................ | 119/14 |

FOREIGN PATENT DOCUMENTS

| | | |
|---|---|---|
| 0566201 A2 | 10/1993 | European Pat. Off. . |
| 0640282 A2 | 3/1995 | European Pat. Off. . |

OTHER PUBLICATIONS

International Search Report (PCT) for Netherlands' Application No. 1001645, filed Nov. 14, 1995.

*Primary Examiner*—John S. Hilten
*Assistant Examiner*—Dave A. Ghatt
*Attorney, Agent, or Firm*—Penrose Lucas Albright

[57] ABSTRACT

An apparatus for automatically milking animals provided with one or more automatic milking robots, teat cups and milking compartments. The teat cups are disposed on a carrier of a milking robot arm so as to be in their inoperative position, inclined relative to the vertical and when being connected to a teat of an animal to be milked, the teat cups are moved from their inclined positions into substantially vertical positions. The carrier includes a box-shaped housing for each teat cup, and each housing contains tubes providing a passageway for the pulsating vacuum and a further passageway for milk received from a teat wherein the passageways as a whole have U-shaped configuration within their housing, the "U" portion being composed of a relatively flexible material whereas the portion of the passageways between the "U" and the teat cup is composed of a relatively stiff material and is movable so as to extend from and be drawn into the corresponding housing. Each milking compartment has a dung gutter and a dung collecting member that in its upper aspect bears against the rear of an animal in the compartment and which is movable within limits with the animal. The collecting member includes a tracking device for tracking movements which communicates with a milking robot disposed in the compartment to cause the milking robot to move in a manner the that conforms to the animal's movements.

77 Claims, 4 Drawing Sheets

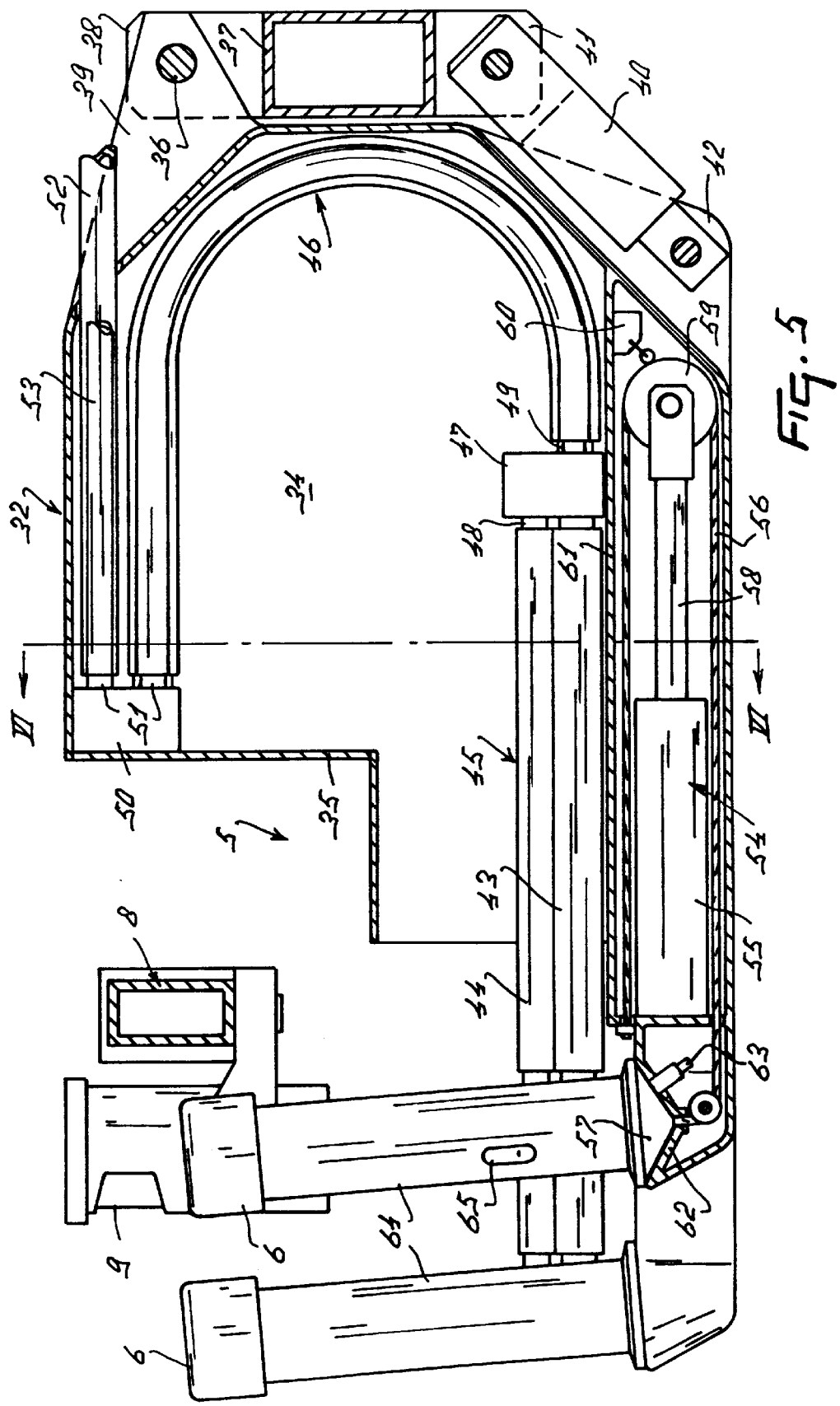

APPARATUS FOR AUTOMATICALLY MILKING ANIMALS

FIELD OF THE INVENTION

The invention relates to an apparatus for milking animals, provided with one or more milking robots, teat cups and milking compartments. More particularly, the invention involves an apparatus of this type wherein the teat cups can be connected quickly and efficiently to the teats of an animal to be milked.

SUMMARY OF THE INVENTION

In accordance with the invention, a rapid and effective emplacement of teat cups on the teats of an animal to be milked, such as a cow, is achieved by disposing the teat cups so that, while being connected, they are moved from an inclined position to one which is more upright so that by a simple upward movement, the teat cups are emplaced directly on the teats of an animal to be milked.

As an inventive feature, a teat cup is disposed on a carrier of a milking robot arm so as to be, in its inoperative position, at an angle with the vertical, while, when it is being connected to a teat of an animal to be milked, it is moved to a substantially vertical position by means of the carrier. The invention thus further relates to an apparatus for milking animals, provided with one or more milking robots, teat cups and milking compartments, characterized in that a teat cup is disposed on a carrier of a milking robot arm so as to be, in its inoperative position, at an angle to the vertical, while, when the relevant teat cup is being connected to a teat of an animal to be milked, it is moved to a substantially vertical position by means of the carrier.

To ensure the teat cup is placed on the carrier in a stable position, according to another inventive feature, the carrier defines a conical seat, and the bottom of the teat cup is also conical in that the diameter of the upper aspect of the conical part of the teat cup is greater than its diameter at the lower part of the teat cup immediately above the conical part. Therefore, the invention additionally relates to an apparatus for milking animals, provided with one or more milking robots, teat cups and milking compartments, characterized in that the teat cup is disposed on a carrier and the carrier comprises a conical seat while the bottom end of the teat cup is also conical, whereby the upper aspect of the conical part of the teat cup has a greater diameter than the teat cup's diameter near its bottom above the conical part.

In a preferred embodiment according to the invention, the carrier comprises four units each carrying a teat cup, while the units are provided with means through which they are pivotable independently of each other about a horizontal pivot shaft. This enables the teat cups to connect individually or simultaneously to the teats of an animal and to be similarly disconnected therefrom.

In accordance with a yet further inventive feature, the units each comprise a boxlike housing, in which a milk tube for the discharge of milk, together with a vacuum pulsation tube for the pulsation of the teat cup are disposed so as to be protected therein.

According to again another inventive feature, the milk tubes and pulsation tubes are arranged in approximately U-shaped configurations in the boxlike housings so as to be sheltered therein. The loop configuration provides extra tube length, which permits the teat cups to be extended away from the carrier. In order to maintain the teat cups in a substantially vertical position when being connected or disconnected, during milking, as well as while in their inoperative position on the carrier, in accordance with a still further inventive feature, the milk tubes and pulsation tubes extend from a teat cup in a first part in which they are aligned within an approximately vertical plane while in a second part they are juxtaposed in a side-by-side relationship. According to a further inventive feature, the second part is also a U-shaped part of the tubes. Due to the fact that the second part is U-shaped and the tubes are juxtaposed, this part of the tubes is relatively flexible so that the teat cups can be moved upwardly without encountering a problem due to too much bending. In order to maintain the teat cups in their substantially vertical position and to allow them to be moved upwardly smoothly, in accordance with another inventive feature, the tubes in their first part the tubes are composed of a relatively rigid material and in their second part they are composed of a relatively flexible material. According to a yet further inventive feature, for the purpose of providing that the first part of the tubes merges smoothly into the second part thereof, the first and second part of the tubes are interconnected by means of a coupling block. Thereby, in accordance with a still further inventive feature, the tube connections are superposed vertically at one side of the coupling block and are juxtaposed horizontally at the other side thereof. To further reinforce the milk tubes and pulsation tubes, they are connected so as to be integral with each other.

In order to bring the teat cups back to their inoperative position, in accordance with a further inventive feature, the apparatus is provided with withdrawing members, by means of which the teat cups are drawn to the carrier. According to another inventive feature, the withdrawing member includes a flexible element, such as a cord, connected at one end to a teat cup and at the other end to a withdrawing element, such as a cylinder and piston member. In this manner, by activating withdrawing members, each of the teat cups can be drawn into its corresponding conical seat on the unit.

In accordance with yet another inventive aspect, the construction includes a collecting member for collecting dung, in which are integrated means for pushing an animal's tail aside. Therefore, the invention also relates to an apparatus for milking animals, provided with one or more milking robots, teat cups and a milking compartment, characterized in that the construction includes a collecting member for collecting dung, in which there are integrated means for pushing an animal's tail aside. In this manner the milking compartment is prevented from being fouled, so that milking can be effected in a very hygienic manner. According to a further inventive feature, the collecting member comprises a gutterlike housing pivotable in the longitudinal direction of the milking compartment. In this manner, when entering the milking compartment, the animal can cause the collecting member to pivot aside, after which, once the animal has entered the milking compartment, the collecting member is pivoted against the animal's rear. When the animal moves in the longitudinal direction of the milking compartment, the collecting member moves together with the animal. According to a further aspect of the invention, the collecting member is also pivotable transversely to the longitudinal direction of the milking compartment. According to again another inventive feature, the collecting member is arranged substantially vertically and the gutterlike housing comprises a part extending obliquely downwards from the cow. In order to be able to discharge the dung collected by the collecting member, in accordance with a further inventive feature, the gutterlike housing empties over a dung discharge gutter. According to another inventive feature, the gutterlike housing of the collecting member, seen from the rear view, has the shape of an approximately right-angled triangle. In accordance with a yet further inventive feature, seen in rear view, a first side of the gutterlike housing comprises a plate-shaped side wall including an angle of approximately 140° measured from the horizontal, and the further side includes an angle of approximately 90° relative to the first side. In order to ensure that the animal's tail, after having been pushed aside by the collecting member, will be comfortably positioned, according to a still further inventive feature, the plate-shaped side wall of the further side comprises, near its upper end, a curved part defining an angle of approximately 30° with the other plate-shaped part thereof.

In order to allow the milking robot to track possible lateral movements of the animal in the milking compartment, in accordance with another inventive feature, the collecting member comprises a cow tracking device, by means of which the milking robot can be controlled to conform to the animal's movements when the animal moves in the longitudinal direction of the milking compartment.

BRIEF DESCRIPTION OF THE DRAWINGS

For a better understanding of the invention and to show how it may be carried into effect, reference will now be made, by way of example, to the accompanying drawings, in which:

FIG. 5 is a side elevational cross-sectional view of the robot arm taken on line V—V in FIG. 4.

DETAILED DESCRIPTION OF THE PREFERRED EMBODIMENT

Figure 1:
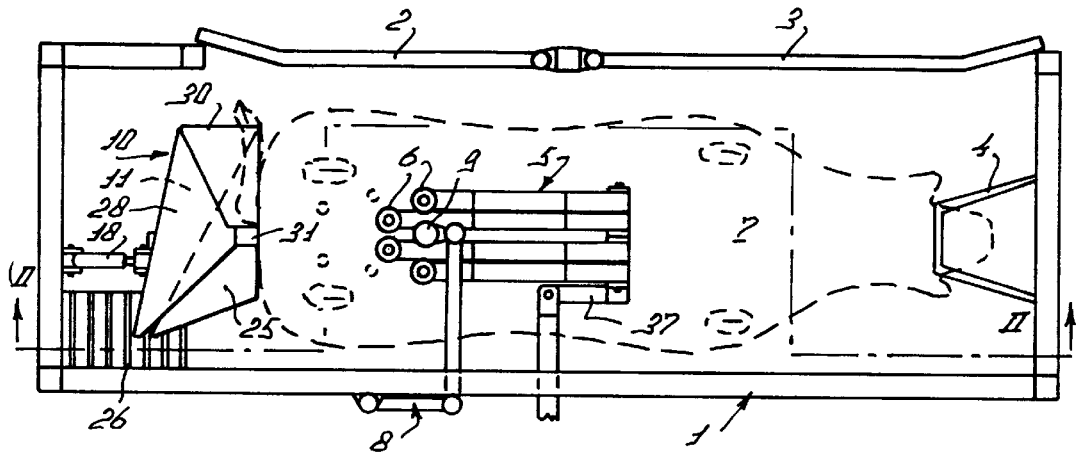
FIG. 1 is a plan view an apparatus for milking animals, provided with a milking compartment, a milking robot and a collecting member for the dung.
Figure 2:
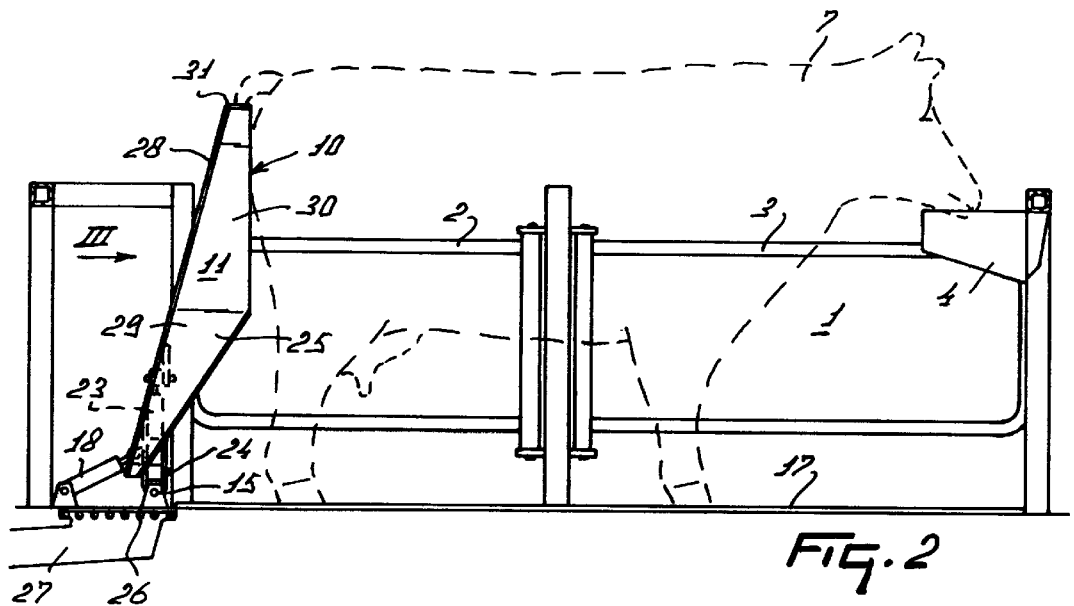
FIG. 2 is a side elevational view of the apparatus shown in FIG. 1.

FIG. 1 shows in plan view an apparatus for milking animals, including a milking compartment 1 provided with an entrance door 2, an exit door 3 and a feed trough 4. Spaced inboard of entrance door 2 and exit door 3, and supported from the opposite side the framework of milking compartment 1, is a milking robot 5, by means of which teat cups 6 can automatically be connected to and disconnected from the teats of an animal 7.

As shown in FIG. 1, in addition to a robot arm for milking robot 5 a further second robot arm 8 is provided which has at its end a detector 9, by means of which the position of the teats of an animal to be milked is determined. In the present embodiment, detector 9 comprises a laser which makes a scanning movement in a horizontal plane. Of course it is also possible to apply another type of detector, such as an ultrasonographic sensor. Milking robot 5 and second robot arm 8 can be activated independently of each other.

Figure 3:
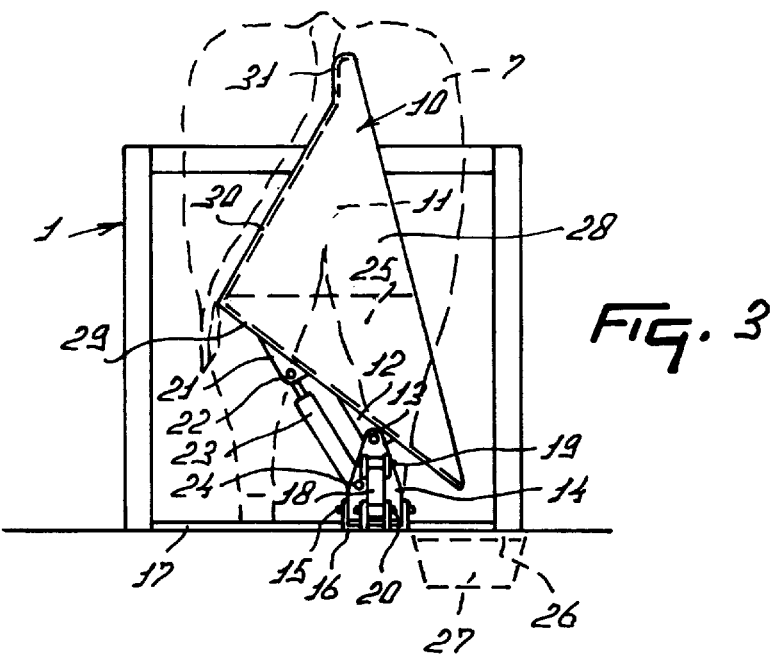
FIG. 3 is a rear elevational view of the apparatus shown in FIGS. 1 and 2.

Near the rear side of milking compartment 1 is further disposed a collecting member 10 for collecting the dung of animal 7 (FIG. 3). Collecting member 10 comprises a gutterlike housing 11 which, near its lower side, is provided with a lug 12 which is pivotably connected to a first horizontal shaft 13 with a second lug 14. First horizontal shaft 13 extends in the longitudinal direction of milking compartment 1. The second lug 14 is further pivotable about a second horizontal shaft 15, which is disposed in a U-shaped profile 16 so that it extends transversely to the longitudinal direction of milking compartment 1. U-shaped profile 16 is fastened on the floor 17 of the milking compartment 1. Between floor 17 and second lug 14 is further disposed a first cylinder and piston member 18 extending in the longitudinal direction of milking compartment 1. One end of first cylinder and piston member 18 is pivotably connected with second lug 14 about a third horizontal shaft 19 and the other end thereof is pivotably connected with floor 17 about a fourth horizontal shaft 20. The third horizontal shaft 19 and the fourth horizontal shaft 20 both extend transversely to the longitudinal direction of milking compartment 1 and both are disposed in U-shaped profiles.

A third lug 21 extends from the gutterlike housing 11 to which, pivotably about a fifth horizontal shaft 22 extending in the longitudinal direction of milking compartment 1, is attached a second cylinder and piston member 23. With its other end, second cylinder 23 is connected so as to be pivotable about a sixth horizontal shaft 24, also extending in the longitudinal direction of milking compartment 1, with second lug 14.

By means of first cylinder and piston member 18, collecting member 10 can be pivoted about the second horizontal shaft 15 in the longitudinal direction of milking compartment 1 and, by means of second cylinder and piston member 23, collecting member 10 can be pivoted about first horizontal shaft 13 in the transverse direction of milking compartment 1.

Housing 11 comprises a triangular plate 25, one point of which extends obliquely downwardly from the cow towards a grid floor 26 provided in the right rear corner of milking compartment 1. Under grid floor 26 is a dung discharge gutter 27 connected to a dung cellar (not shown). The horizontally extending upper edge of plate 25 is situated at a height of approximately 1.25 meters above floor 17. Housing 11 furthermore comprises, seen in rear view, a quadrangular back wall 28 made of a plate. Seen in rear view, a first side 29 of back wall 28 includes an angle of approximately 140° (or 40°) relative to the horizontal and further side 30 includes an angle of approximately 90° with first side 29. Further side 30 comprises near its upper end a projecting part 31 including an angle of approximately 30° with further side 30.

Collecting member 10 is additionally provided with a cow tracking device (not shown), by means of which milking robot 5 can be controlled to conform to the animal's movements when animal 7 moves in the longitudinal direction of the milking compartment 1.

Figure 6:
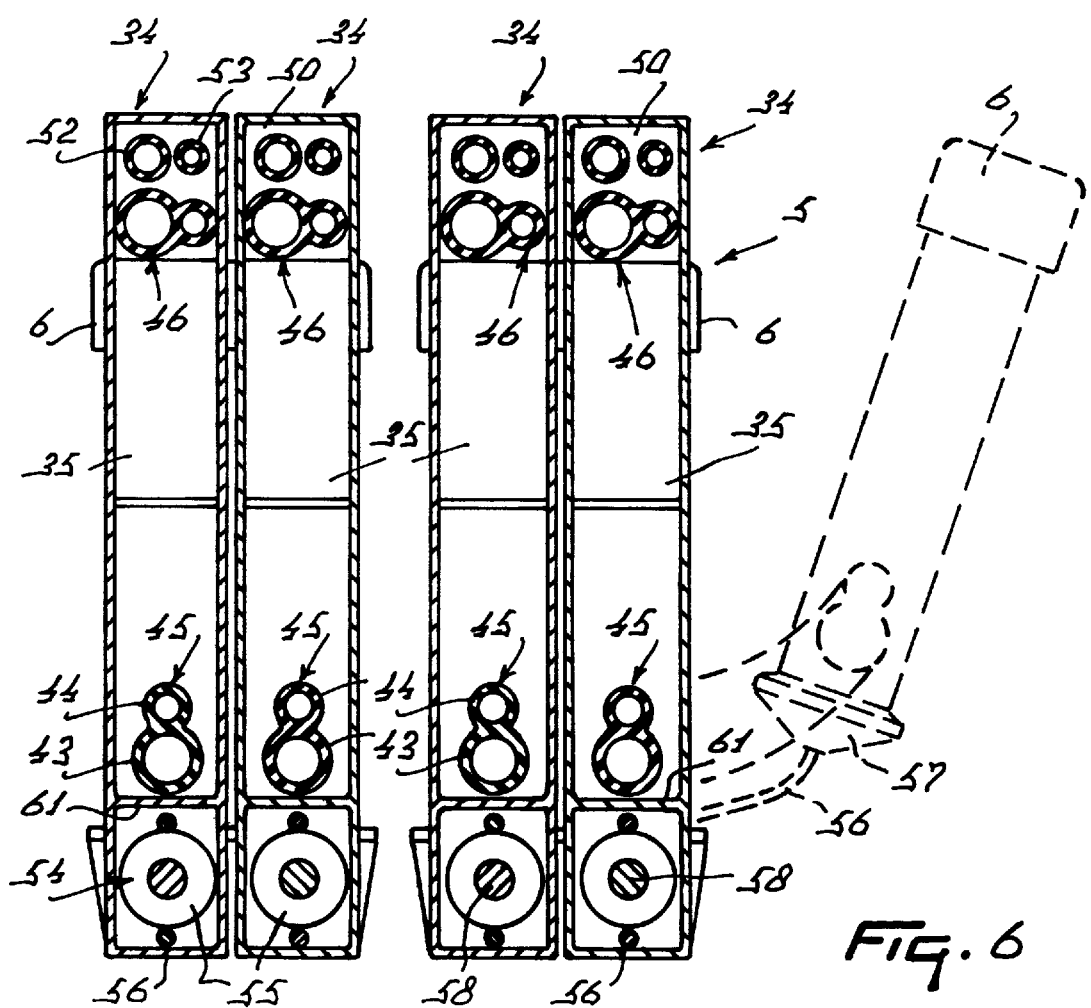
FIG. 6 is a cross-sectional elevational view of the robot taken on line VI—VI in FIG. 5.
Figure 4:
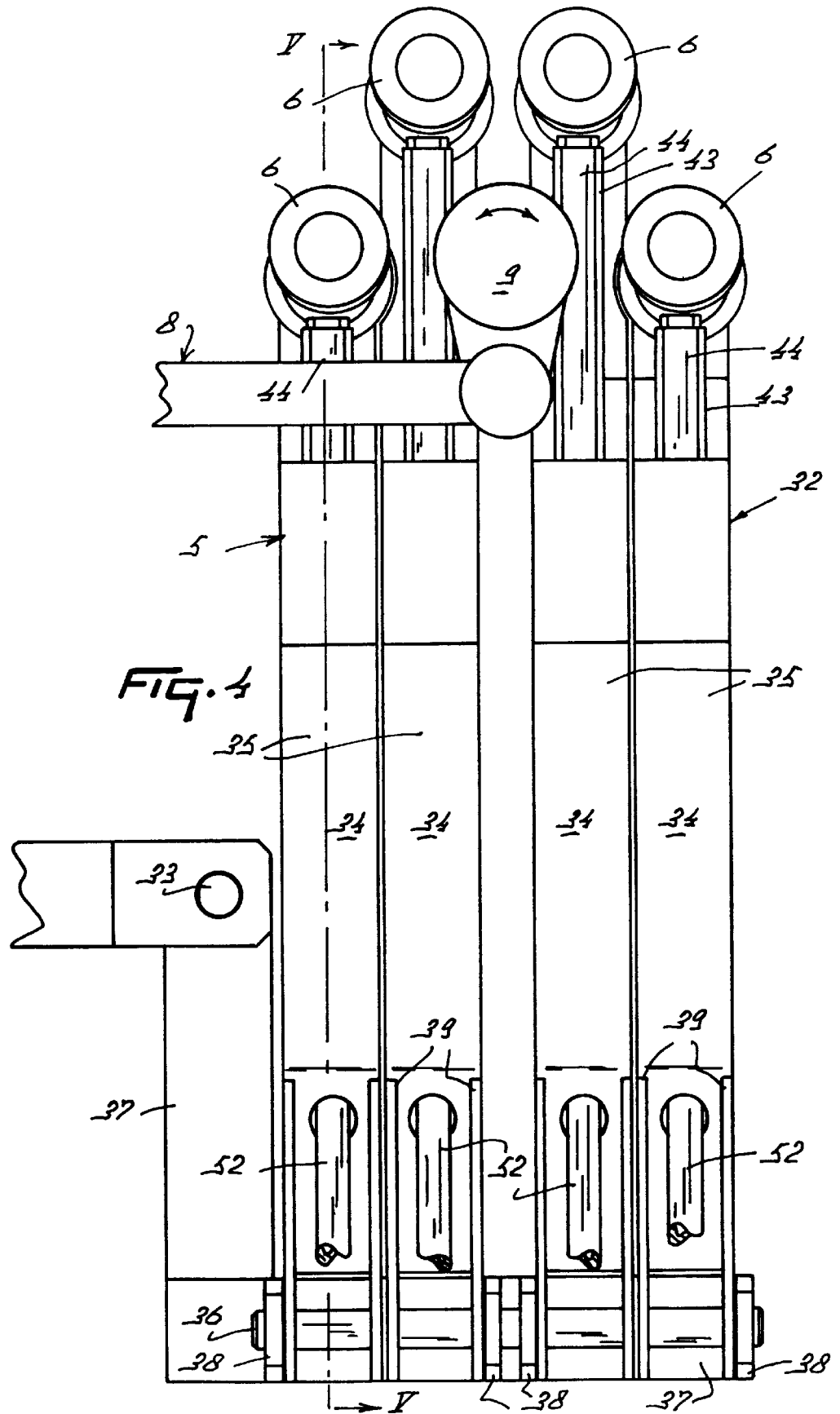
FIG. 4 is a detailed plan view of a milking robot arm according to FIG. 1.

In FIGS. 4 to 6, the portion of milking robot 5 that is under animal 7 for the milking operation is shown in detail. Teat cups 6 rest on a carrier 32 which is pivotable about a vertical shaft 33. The carrier 32 comprises four juxtaposed units 34 each carrying near an end a teat cup 6. The units 34 each comprise a boxlike housing 35, which is pivotable about a horizontal shaft 36. By means of two juxtaposed U-profiles 38, horizontal shaft 36 is disposed on an L-shaped box girder 37 of milking robot 5. Each unit 35 is provided with two lugs 39 which are pivotably disposed on horizontal shaft 36. Each of units 34 is individually pivotable about horizontal shaft 36 by means of a cylinder and piston member 40. Cylinder and piston member 40 is connected at one end, by means of lugs 41, with a L-shaped box girder 37 and, at the other end, by means of lugs 42, with the boxlike housing 35. The cylinder and piston member 40 may also be designed as a step motor.

In each of boxlike housings 35 milk tubes 43 and pulsation tubes 44 for teat cups 6 are accommodated. When teat cups 6 rest on carrier 32, milk tubes and pulsation tubes 43 and 44 are located approximately in a semi-circular U-shaped configuration in boxlike housings 35 (FIG. 5). A first part 45 of the milk tubes and pulsation tubes 43 and 44 horizontally extends from a teat cup 6 in a vertical plane and a second part 46 of the tubes comprises a U-shaped part 46 located in the same vertical plane. The first and second parts 45 and 46 respectively of tubes 43 and 44 are connected to each other by means of a coupling block 47. The first part 45 of the tubes is connected to connecting nipples 48, which are arranged one below the other at one side of coupling block 47, whereas the second part 46 of the tubes is connected to connecting nipples 49, which are disposed next to each other at the other side of coupling block 47. By means of coupling block 47, a kink-free connection is provided between first part 45, where the tubes are located above each other, the second part 46, where the tubes are located next to each other. Both in the first and second parts 45 and 46 of the tubes, the material that define the milk tubes and pulsation tubes 43 and 44 are integral. Furthermore, the material of which first part 45 of the tubes is composed is relatively rigid that provides partial support for teat cup 6. On the other hand, the second part 46 of each of tubes 43 and 44 is composed of a relatively flexible material. As a result, units 34, without encountering too much resistance from tubes 43 and 44, can be moved without kinks being produced therein. The other end of the second part 46 of the tubes is connected with a second coupling block 50, which is provided with two pairs of superposed connecting nipples 51, to which, on the one hand, the end of the second part 46 of the tubes is connected and, on the other hand, a pipelike milk line 52 and a pipelike pulsation line 53 are connected (FIGS. 5 and 6). By means of the second coupling block 50, disposed in the left upper part of the boxlike housing 35, a diversion of 180° is provided for the combined milk and pulsation tubes 43 and 44. Pipelike milk line 52 and pipelike pulsation line 53 are situated next to each other, but are not integral.

In the lower side of each boxlike housing 35 there is moreover disposed a withdrawing member 54, by means of which the teat cups 6 can be withdrawn towards the carrier 32. Withdrawing member 54 comprises a cylinder and piston unit 55, arranged in the lower part of boxlike housing 35. The withdrawing member 54 is additionally provided with a cord 56 which is connected at one end to boxlike housing 35 and at the other end with a conical bottom side 57 of teat cup 6. Cord 56 is further received over a pulley 59 that is rotatably disposed at the end of the piston rod 58 of the cylinder and piston unit 55. In the arrangement shown in FIG. 5, piston rod 58 is entirely extended, whereby pulley 59 touches a sensor 60, designed as a switch, which is disposed against a wall 61 of boxlike housing 35. By means of switch 60 it can be recorded whether cord 56 is taut whereby teat cup 6 is properly received by carrier 32. When teat cup 6 is so received in carrier 32, switch 60 supplies a signal to the computer. When, after a fixed period of time after the cylinder and piston unit 55 has been activated, no signal is supplied by switch 60, cylinder and piston unit 55 is activated again and, if again no signal is supplied by switch 60, the computer will provide an error message which, by means of a radiophone, other means which will occur to one skilled in the art, is passed onto an operator.

Each carrier 32 is provided near its end with a conical seat 62 corresponding to the conical bottom 57 of teat cup 6.

Thereby conical seat 62 is disposed in carrier 32 in such a way that, when the lower end of carrier 32 is located in a horizontal plane, a teat cup 6 received in conical seat 62 is somewhat forwardly inclined. The angle at which the teat cup 6 is positioned relative to the vertical is approximately between 3° and 10° and is preferably 5°. When the teat cup 6 is pivoted about shaft 36 by means of cylinder and piston member 40 in order to be connected to the teat of an animal to be milked, said teat cup 6 assumes a substantially vertical position during pivoting. In this manner teat cup 6 may be connected to the teat of an animal to be milked by simply pivoting unit 32.

For the purpose of verifying whether, by activating the withdrawing member 54, a teat cup 6 is properly received in conical seat 62, as sensor 63 is fitted in conical seat 62 that records whether conical bottom 57 of teat cup 6 is correctly received in conical seat 62. Sensor 63 may be a micro-switch or a conductivity sensor. After the computer has supplied a signal to withdrawing member 54 to withdraw teat cup 6 onto the carrier, the computer verifies whether, after a predetermined period of time, a signal has been supplied by a sensor 63. When no signal is so supplied, it is possible, as described above, to draw the attention of such fact to the operating person by means of the computer.

On the outer casing 64 of the teat cup 6 is a sensor 65, which provides a signal to the computer concerning the angle at which the teat cup 6 is positioned relative to the vertical. Sensor 65 may thereby be designed as a clinometer or a simple mercury switch. when the teat cup 6 has been pivoted over a pre-set angle, say 45°, relative to the vertical, the vacuum in the teat cup is automatically removed by the computer and the withdrawing member 54 is automatically activated to withdraw the teat cup 6 onto conical seat 62, so that teat cup 6 is prevented from falling onto the floor and becoming dirty. When teat cup 6, after withdrawing member 54 has been activated, does not return to seat 62 after a pre-set period of time, which is ascertained by sensor 60 and/or sensor 63, this is brought to the attention of the operating person in the above-described manner. In an apparatus of the above-mentioned type, the aforementioned sensors 60, 63 and 65 can be provided to operate individually as well as in combination with each other.

Although I have disclosed the preferred embodiment of my invention, it is to be understood that it is capable of other adaptations and modifications within the scope of the following claims.

I claim:

1. An apparatus for milking animals comprising:
    at least one milking robot,
    at least one set of teat cups,
    at least one milking compartment,
    at least one carrier supporting said set of teat cups a rigid, inclined disposition until said teat cups are connecting to teats of a cow whereupon said rigid, inclined disposition is relinquished,
    means for moving said teat cups wherein, during connecting the teat cups to the teats of said cow, the teat cups are moved from an initial inclined position into a substantially vertical position.

2. An apparatus in accordance with claim 1, comprising a milking robot arm which supports said carrier, said carrier supporting a said teat cup so that in its inoperative position, such teat cup is at an angle to a vertical line, and when such teat cup is being connected to a teat of an animal to be milked such teat cup is moved into a substantially vertical position by means of said carrier.

3. An apparatus in accordance with claim 1 wherein said milking robot comprises a milking robot arm, said carrier supported by said arm, said carrier comprising a conical seat for each said teat cup, each said teat cup having a conical bottom which corresponds to said conical seat, said conical bottom having in its upper aspect a diameter which is greater than the diameter of said teat cup immediately above said bottom.

4. An apparatus in accordance with claim 3, wherein said carrier comprises four units, each said unit supporting a respective one of said teat cups, a horizontal pivot shaft, each of said units being independently pivotal about said horizontal pivot shaft.

5. An apparatus in accordance with claim 4 wherein each said unit comprises a box-shaped housing, a milk tube and a pulsation tube received in said housing which are connected to the teat cup supported by said carrier, said milk tube and said pulsation tube being disposed in said housing so as to be protected thereby.

6. An apparatus in accordance with claim 5 wherein said milk tubes and said pulsation tubes in said housings are arranged in an approximately U-shaped configuration in their respective housings.

7. An apparatus as claimed in claim 5 wherein said milk tubes and said pulsation tubes in each said housing comprise two parts, said milk tubes and said pulsation tubes in said first part being situated one above the other and said milk tubes and said pulsation tubes in said second part being juxtaposed in a side-by-side relationship.

8. An apparatus in accordance with claim 7 wherein said tubes in said second part are arranged in a U-shaped configuration.

9. An apparatus in accordance with claim 8 wherein said milk tubes and said pulsation tubes in said second part are composed of a material which is flexible relative to said milk tubes and said pulsation tubes in said firs part and said milk tubes and said pulsation tubes in said first part are composed of a material which is rigid relative to said milk tubes and said pulsation tubes in said second part.

10. An apparatus in accordance with claim 7 comprising a coupling block, said coupling block interconnecting said milk tubes and said pulsation tubes in said first part respectively with said milk tubes and said pulsation tubes in said second part.

11. An apparatus in accordance with claim 5 wherein said milk tubes and said pulsation tubes are longitudinally affixed to each other.

12. An apparatus in accordance with claim 1, comprising dung collecting means, said dung collecting means including deflection means for deflecting an animal's tail aside.

13. An apparatus in accordance with claim 12 wherein said dung collecting means comprises a gutter-like housing which is movable in the longitudinal direction of said milking compartment.

14. An apparatus in accordance with claim 13 wherein said milking compartment includes pivot means connected to said gutter-like housing whereby said gutter-like housing is pivotable in the longitudinal direction of the milking compartment.

15. An apparatus in accordance with claim 13 wherein said gutter-like housing comprising a bottom extending obliquely downwardly relative to the position of an animal to be milked in said milking compartment.

16. An apparatus in accordance with claim 13 wherein said milking compartment comprises a dung discharge gutter, said gutter-like housing being disposed with its lower aspect above said dung discharge gutter.

17. An apparatus in accordance with claim 13 wherein said gutter-like housing, as seen from the rear of said milking compartment, has the approximate shape of a right angle triangle.

18. An apparatus in accordance with claim 13 wherein said gutter-like housing comprises a first side which, as seen from the rear, comprises a plate-shaped sidewall comprising an angle of approximately 140° relative to the horizontal.

19. An apparatus in accordance with claim 18 wherein said gutter-like housing comprises a further side that, as seen from the rear, defines an angle of approximately 90° relative to said first side.

20. An apparatus in accordance with claim 19 wherein said further side comprises at its upper aspect a deflection part that projects upwardly relative to the remainder of said further side.

21. An apparatus in accordance with claim 12 wherein said dung collecting means is arranged in said milking compartment to extend upwardly therein.

22. An apparatus in accordance with claim 12 wherein said dung collecting means comprises tracking means for tracking the position of an animal in said milking compartment and control means for controlling the position of said milking robot relative to said milking compartment, said tracking means transmitting signals to said control means which cause said milking robot to conform to the movements of said animal in longitudinal directions of said milking compartment.

23. An apparatus in accordance with claim 1 comprising a withdrawing means connected to each said teat cup for moving said teat cup towards said carrier.

24. An apparatus in accordance with claim 23 wherein said withdrawing means comprises a piston and cylinder unit and a flexible element interconnecting each said teat cup with said piston and cylinder unit.

25. An apparatus for milking animals comprising:
at least one milking robot, said milking robot comprising a milking robot arm,
at least one set of teat cups,
at least one milking compartment,
at least one carrier providing a rigid, inclined support to said set of teat cups until said teat cups are connecting to teats of a cow whereafter said rigid, inclined support is relinquished,
said carrier supported by said arm, said carrier comprising a conical seat for each said teat cup,
means for moving said teat cups wherein, during connecting the teat cups to the teats of said cow, the teat cups are moved from an initial inclined position into a substantially vertical position,
each said teat cup having a conical bottom which corresponds to said conical seat, said conical bottom having in its upper aspect a diameter which is greater than the diameter of said teat cup immediately above said bottom,
said carrier further comprising four units and a horizontal pivot shaft, each said unit supporting a respective one of said teat cups, each of said units being independently pivotal about said horizontal pivot shaft,
each said unit comprising a box-shaped housing, a milk tube and a pulsation tube received in said housing which are connected to the teat cup supported by said carrier, said milk tube and said pulsation tube being disposed in said housing so as to be protected thereby,
said milk tubes and said pulsation tubes in each said housing comprising a coupling block and two parts, said milk tubes and said pulsation tubes in said first part being situated one above the other and said milk tubes and said pulsation tubes in said second part being juxtaposed in a side-by-side relationship, said coupling block interconnecting said milk tubes and said pulsation tubes in said first part respectively with said milk tubes and said pulsation tubes in said second part, said coupling block's connections to said first part being superposed and said coupling block's connections to said second part being juxtaposed in a side-by-side relationship.

26. An apparatus for milking animals comprising at least one milking robot, at least one teat cup, said teat cup including a top having an opening for receiving an animal's teat, sides and a bottom, at least one milking compartment for receiving an animal to be milked by said milking robot, a carrier for said teat cup and a milking robot arm that supports said carrier, said carrier including a seat and supporting said teat cup on said seat so that in an inoperative position, the bottom of said teat cup is removably received on said seat so that said teat cup is initially disposed at an inclined angle and when said teat cup is being connected to a teat of an animal to be milked, said teat cup is lifted from said seat into a substantially vertical position by means of said carrier.

27. An apparatus in accordance with claim 3, comprising dung collecting means which is deposed in said milking compartment, said dung collecting means including deflection means for deflecting an animal's tail aside.

28. An apparatus in accordance with claim 27 wherein said dung collecting means comprises a gutter-like housing which is movable in the longitudinal direction of said milking compartment.

29. An apparatus in accordance with claim 28 wherein said milking compartment includes pivot means connected to said gutter-like housing whereby said gutter-like housing is pivotable in the longitudinal direction of the milking compartment.

30. An apparatus in accordance with claim 28 wherein said gutter-like housing comprising a bottom extending obliquely downwardly relative to the position of an animal to be milked in said milking compartment.

31. An apparatus in accordance with claim 27 wherein said dung collecting means is arranged in said milking compartment to extend upwardly therein.

32. An apparatus for milking animals comprising at least one milking robot, at least one teat cup, said teat cup including a top having an opening for receiving an animal's teat, sides and a bottom, at least one milking compartment for receiving an animal to be milked by said milking robot, a carrier for said teat cup and a milking robot arm that supports said carrier, said carrier including a seat, said carrier supporting said teat cup in said seat so that in an inoperative position, the bottom of said teat cup is received in said seat so that said teat cup is initially disposed at an inclined angle and when said teat cup is being connected to a teat of an animal to be milked, said teat cup is moved into a substantially vertical position by means of said carrier, and further comprising a withdrawing means connected to said teat cup from moving said teat cup towards said carrier.

33. An apparatus in accordance with claim 32 wherein said withdrawing means comprises a piston and cylinder unit and a flexible element interconnecting said teat cup with said piston and cylinder unit.

34. An apparatus for milking animals comprising at least one milking robot, four teat cups, each said teat cup including a top having an opening for receiving an animal's teat, sides and a bottom, at least one milking compartment for receiving an animal to be milked by said milking robot, a carrier for said teat cups and a milking robot arm that supports said carrier, said carrier including a seat for each said teat cup, said carrier supporting each said teat cup for a corresponding said seat so that in an inoperative position, the bottom of each said teat cup is received in a corresponding said seat so that said teat cup is initially disposed at an inclined angle and when said teat cup is being connected to a teat of an animal to be milked, said teat cup is moved into a substantially vertical position by means of said carrier, said carrier comprising four units, each of said units supporting a respective teat cup and having a horizontal pivot shaft, each of said units being independently pivotal about said horizontal pivot shaft.

35. An apparatus in accordance with claim 34 wherein each said unit comprises a box-shaped housing, a milk tube and a pulsation tube received in said housing which are connected to said respective teat cup supported by said unit, said milk tube and sais pulsation tube being disposed in said housing so as to be protected thereby.

36. An apparatus in accordance with claim 35 wherein said milk tubes and said pulsation tubes in said housings are arranged in an approximately U-shaped configuration in their respective housings.

37. An apparatus as claimed in claim 35 wherein said milk tubes and said pulsation tubes in each said housing comprise two parts, said milk tubes and said pulsation tubes in said first part being situated one above the other and said milk tubes and said pulsation tubes in said second part being juxtaposed in a side-by-side relationship.

38. An apparatus in accordance with claim 37 wherein said tubes in said second part are arranged in a U-shaped configuration.

39. An apparatus in accordance with claim 38 wherein said milk tubes and said pulsation tubes in said second part are composed of a relatively flexible material and said milk tubes and said pulsation tubes in said first part are composed of a relatively rigid material.

40. An apparatus in accordance with claim 37 comprising a coupling block, said coupling block interconnecting said milk tubes and said pulsation tubes in said first part respectively with said milk tubes and said pulsation tubes in said second part.

41. An apparatus in accordance with claim 35 wherein said milk tubes and said pulsation tubes are longitudinally affixed to each other.

42. An apparatus for milking animals which comprises a milking compartment, a milking robot receivable in said milking compartment, said milking robot comprising a plurality of housings, a teat cup supported by each said housing, each said housing containing a pulsation passageway and a milk passageway which are connected to said teat cup supported by such housing, said passageways comprising a first part and a second part, the material defining said first part being a material which is rigid relative to said second part and the material defining said second part being a material which is flexible relative to said first part, a portion of said first part being movable with said teat cup to outside of said housing when said teat cup is being connected and is connected to the teat of an animal being milked and said first part being movable to within said housing after said teat cup has been connected to the teat of an animal being milked, said second part including a curved portion disposed to permit the aforesaid movements of said first part.

43. An apparatus for automatically milking animals which comprises a milking compartment, a milking robot associated with said milking compartment for connecting and disconnecting teat cups of an animal being milked and who has been milked in said milking compartment, dung collecting means at the rear of said milking compartment, said dung collecting means being in contact with the rear of said animal in said milking compartment and being movable in longitudinal directions of said milking compartment in a manner to remain in contact with the rear part of said animal, said dung collecting means comprising animal tracking device, control means interconnecting said animal tracking device and said automatic milking robot so that said robot is moved to conform to the movements of the animal being milked in said milking compartment.

44. An apparatus for milking animals comprising at least one milking robot, at least one teat cup, at least one milking compartment, a carrier for said teat cup, said carrier comprising a conical seat, the bottom of said teat cup being conical, the upper aspect of said conical bottom of said teat cup having a greater diameter than the diameter of said teat cup immediately above said bottom.

45. An apparatus in accordance with claim 44 comprising withdrawing means connected to each said teat cup for moving them towards said carrier.

46. An apparatus in accordance with claim 45 wherein said withdrawing means comprises a piston and cylinder unit and a flexible element interconnecting each said teat cup with said piston and cylinder unit.

47. An apparatus in accordance with claim 44, wherein said carrier comprises four units, each said unit supporting a respective teat cup and a horizontal pivot shaft, each of said units being independently pivotal about said horizontal pivot shaft.

48. An apparatus in accordance with claim 47 wherein each said unit comprises a box-shaped housing, a milk tube and a pulsation tube received in said housing which are connected to the respective teat cup supported by said unit, said milk tube and said pulsation tube being disposed in said housing so as to be protected thereby.

49. An apparatus in accordance with claim 48 wherein said milk tubes and said pulsation tubes in said housings are arranged in an approximately U-shaped configuration in their respective housings.

50. An apparatus as claimed in claim 48 wherein said milk tubes and said pulsation tubes in each said housing comprise two parts, said milk tubes and said pulsation tubes in said first part being situated one above the other and said milk tubes and said pulsation tubes in said second part being juxtaposed in a side-by-side relationship.

51. An apparatus in accordance with claim 50 wherein said tubes in said second part are arranged in a U-shaped configuration.

52. An apparatus in accordance with claim 51 wherein said milk tubes and said pulsation tubes in said second part are composed of a relatively flexible material and said milk tubes and said pulsation tubes in said first part are composed of a relatively rigid material.

53. An apparatus in accordance with claim 50 comprising a coupling block, said coupling block interconnecting said milk tubes and said pulsation tubes in said first part respectively with said milk tubes and said pulsation tubes in said second part.

54. An apparatus in accordance with claim 53 wherein said coupling block's connections to said first part are superposed and said coupling block's connections to said second part are juxtaposed in a side-by-side relationship.

55. An apparatus in accordance with claim 48 wherein said milk tubes and said pulsation tubes are longitudinally affixed to each other.

56. An apparatus for milking animals comprising at least one milking robot, at least one teat cup, at least one milking compartment, a carrier for said teat cup, and dung collecting means,
said carrier comprising a conical seat the bottom of said teat cup being conical, the upper aspect of said conical bottom of said teat cup having a greater diameter than the diameter of said teat cup immediately above said bottom,
said dung collecting means including deflection means for deflecting an animal's tail aside from a remainder part of said dung collecting means.

57. An apparatus in accordance with claim 56 wherein said dung collecting means comprises a gutter-like housing which is movable in the longitudinal direction of said milking compartment.

58. An apparatus in accordance with claim 57 wherein said milking compartment includes pivot means connected to said gutter-like housing whereby said gutter-like housing is pivotable in the longitudinal direction of the milking compartment.

59. An apparatus in accordance with claim 57 wherein said gutter-like housing comprising a bottom extending obliquely downwardly relative to the position of an animal to be milked in said milking compartment.

60. An apparatus in accordance with claim 57 wherein said milking compartment comprises a dung discharge gutter, said gutter-like housing being disposed with its lower aspect above said dung discharge gutter.

61. An apparatus in accordance with claim 57 wherein said gutter-like housing, as seen from the rear of said milking compartment, has the approximate shape of a right angle triangle.

62. An apparatus in accordance with claim 57 wherein said gutter-like housing comprises a first side which, as seen from the rear, comprises a plate-shaped sidewall including an angle of approximately 140° relative to the horizontal.

63. An apparatus in accordance with claim 62 wherein said gutter-like housing comprises a further side that, as seen from the rear, defines an angle of approximately 90° relative to said first side.

64. An apparatus in accordance with claim 63 wherein said further side comprises at its upper aspect a deflection part that projects upwardly relative to the remainder of said further side.

65. An apparatus in accordance with claim 56 wherein said dung collecting means is arranged in said milking compartment to extend upwardly therein.

66. An apparatus in accordance with claim 56 wherein said dung collecting means comprises tracking means for tracking the position of an animal to be milked or being milked in said milking compartment and control means for controlling the position of said milking robot relative to said milking compartment, said tracking means transmitting signals to said control means for causing said milking robot to conform to the movements of said animal in longitudinal directions of said milking compartment.

67. An Apparatus for milking animals comprising at least one milking robot, at least one teat cup, at least one milking compartment, a carrier for said teat cup and a milking robot arm that supports said carrier, said carrier supporting said teat cup so that in an operative position said teat cup is initially disposed at an inclined angle and when said teat cup is being connected to a teat of an animal to be milked, said teat cup is moved into a substantially vertical position by means of said carrier, dung collecting means, said dung collecting means including deflection means for deflecting an animal's tail aside, said dung collecting means comprising a gutter-housing which is movable in a longitudinal direction of said milking compartment, said milking compartment comprising a dung discharge gutter, said gutter-like housing being disposed with its lower aspect above said dung discharge gutter.

68. An apparatus for milking animals comprising at least one milking robot, at least one teat cup, at least one milking compartment, a carrier for said teat cup and a milking robot arm that supports said carrier, said carrier supporting said teat cup so that in an operative position, said teat cup is initially disposed at an inclined angle and when said teat cup is being connected to a teat of an animal to be milked, said teat cup is moved into a substantially vertical position by means of said carrier, dung collecting means, said dung collecting means including deflection means for deflecting an animal's tail aside, said dung collecting means comprising a gutter-like housing which is movable in the longitudinal direction of said milking compartment, said gutter-like housing, as seen from the rear of said milking compartment, having the approximate shape of a right angle triangle.

69. An apparatus for milking animals comprising at least one milking robot, at least one teat cup, at least one milking compartment, a carrier for said teat cup and a milking robot arm that supports said carrier, said carrier supporting said teat cup so that in an operative position, said teat cup is initially disposed at an inclined angle and when said teat cup is being connected to a teat of an animal to be milked, said teat cup is moved into a substantially vertical position by means of said carrier, dung collecting means, said dung collecting means including deflection means for deflecting an animal's tail aside, said dung collecting means comprising a gutter-like housing which is movable in the longitudinal direction of said milking compartment, said gutter-like housing comprising a first side which, as seen from the rear, comprises a plate-shaped sidewall comprising an angle of approximately one hundred forty degrees relative to the horizontal.

70. An Apparatus in accordance with claim 69 wherein said gutter-like housing comprises a further side that, as seen from the rear, defines an angle of approximately ninety degrees relative to said first side.

71. An apparatus in accordance with claim 70 wherein said further side comprises at its upper aspect a deflection part that projects upwardly relative to the remainder of said further side.

72. An apparatus for milking animals comprising at least one milking robot, at least one teat cup, at least one milking compartment, a carrier for said teat cup and a milking robot arm that supports said carrier, said carrier supporting said teat cup so that in an operative position, said teat cup is initially disposed at an inclined angle and when teat cup is being connected to a teat of an animal to be milked, said teat cup is moved into a substantially vertical position by means of said carrier, dung collecting means, said dung collecting means including deflection means for deflecting an animal's tail aside, said dung collecting means comprising tracking means for tracking the position of an animal in said milking compartment and control means for controlling the position of said milking robot relative to said milking compartment, said tracking means transmitting signals to said control means that cause said milking robot to conform to the movements of said animal in longitudinal directions of said milking compartment.

73. An apparatus for milking animals comprising at least one milking robot, at least one teat cup, at least one milking compartment, a carrier for said teat cup and a milking robot that supports said carrier, said carrier supporting said teat cup so that in an operative position, said teat cup is initially disposed at an inclined angle and when said teat cup is being connected to a teat of an animal to be milked, said teat cup is moved into a substantially vertical position by means of said carrier, said milking robot comprising a milking robot arm, said carrier supported by said arm, said carrier comprising a conical seat for receiving said teat cup, said teat cup comprising a conical bottom which corresponds to said conical seat, said conical bottom comprising an upper aspect and a lower aspect, said conical bottom tapering from said upper aspect to said lower aspect, said upper aspect having a diameter which is greater than a greatest diameter of said teat cup immediately above said conical bottom.

74. An apparatus for milking animals comprising at least one milking robot, at least one teat cup, at least one milking compartment, a carrier for said teat cup and a milking robot arm that supports said carrier, said carrier supporting said teat cup so that in an operative position, said teat cup is initially disposed at an inclined angle and when said teat cup is being connected to a teat of an animal to be milked, said teat cup is moved into a substantially vertical position by means of said carrier, said carrier comprising four units, each said unit supporting a respective teat cup and a horizontal pivot shaft, each of said units being independently pivotal about said horizontal pivot shaft, each said unit comprising a box-shaped housing, a milk tube and pulsation tube received in said housing which are connected to said respective teat cup supported by said unit, said milk tube and said pulsation tube being disposed in said housing so as to be protected thereby, said milk tubes and said pulsation tubes in each said housing comprising two parts, said milk tubes and said pulsation tubes in said first part being situated one above the other and said milk tubes and said pulsation tubes in said second part being juxtaposed in a side-by-side relationship, a coupling block, said coupling block interconnecting said milk tubes and said pulsation tubes in said first part respectively with said milk tubes and said pulsation tubes in said part, said coupling block's connections to said first part being superposed and said coupling block's connections to said second part being juxtaposed in a side-by-side relationship.

75. An apparatus for automatically milking animals comprising a milking compartment, teat cups, a robot mechanism including a robot arm for automatically connecting said teat cups to the teats of an animal to be milked, a feeding trough in the forward part of said milking compartment, detector means for detecting the locations of teats of an animal to be milked including guidance means for controlling the movements of said robot arms, a gutter for receiving excrement from an animal in said milking compartment, said gutter being disposed in the rear aspect of said milking compartment, dung collecting means movably connected to said milking compartment so as to receive excrement from an animal in said milking compartment and to discharge said excrement into said gutter, said dung collecting means bearing against the rear of an animal to be milked in said milking compartment to assist in positioning the animal in said milking compartment.

76. An apparatus in accordance with claim 75 wherein said dung collecting means comprises a gutter-like housing which is movable in the longitudinal direction of said milking compartment.

77. An apparatus in accordance with claim 75 wherein said dung collecting means comprises tracking means for tracking the position of an animal in said milking compartment and control means for controlling the position of said robot mechanism relative to said milking compartment, said tracking means transmitting signals to said control means that cause said robot mechanism to conform to the movements of said animal in said longitudinal directions of said milking compartment.

* * * * *